(No Model.)
J. B. FITZPATRICK.
LIFTER FOR COOKING UTENSILS.
No. 280,596. Patented July 3, 1883.
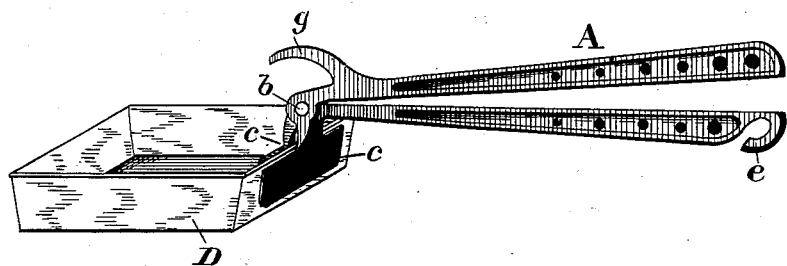
Fig. 1.
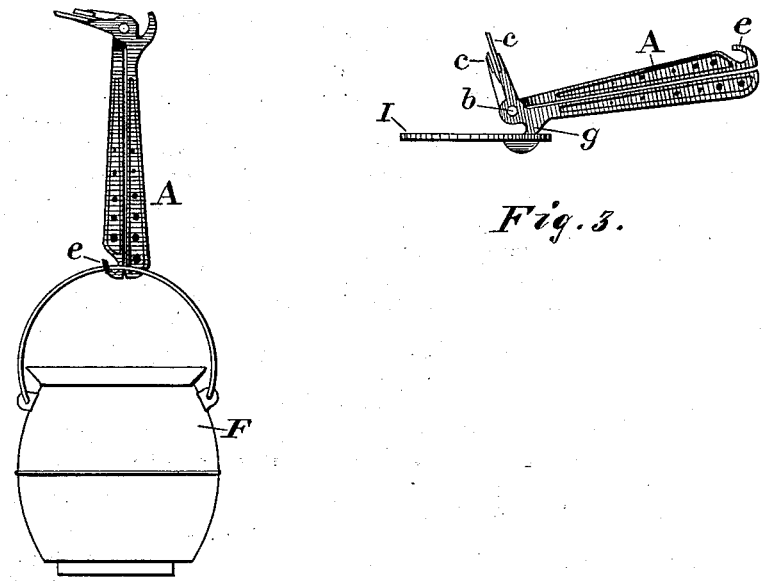
Fig. 2.
Fig. 3.
Witnesses:
A. E. Eader.
John E. Morris.
Inventor:
J. B. Fitzpatrick,
By Chas. B. Mann,
Attorney.

UNITED STATES PATENT OFFICE.

JAMES B. FITZPATRICK, OF WHEELING, WEST VIRGINIA.

LIFTER FOR COOKING UTENSILS.

SPECIFICATION forming part of Letters Patent No. 280,596, dated July 3, 1883.

Application filed May 21, 1883. (No model.)

*To all whom it may concern:*

Be it known that I, JAMES B. FITZPATRICK, a citizen of the United States, residing at Wheeling, in the county of Ohio and State of West Virginia, have invented certain new and useful Improvements in Lifters for Cooking Utensils, of which the following is a specification, reference being had therein to the accompanying drawings.

My invention relates to an improved lifter, and is a combined implement adapted for many uses in the kitchen.

In the drawings hereto annexed, Figure 1 illustrates the implement as employed to lift a bake-pan. Fig. 2 shows it employed to lift a pot or kettle. Fig. 3 is a view of it when used as a stove-lid lifter.

The two levers A are jointed together at b, like a pair of tongs or pinchers. Each lever has a laterally-projecting jaw, c, consisting of a flat plate. The two plate-jaws constitute a gripper adapted to clamp a bake-pan, D, or other similar vessel, as shown in Fig. 1. One of the levers has at its extremity a hook, e, which is adapted to engage with the bail of a pot or kettle, F, and thus serve to lift it, as seen in Fig. 2. When thus employed, the hand may grip both levers A, which serve as a good hand-grasp. One of the levers has near the pivot or joint a curved prong, g, projecting laterally, and in an opposite direction from the grip-jaws. This curved prong is adapted to lift a stove-lid, I, as seen in Fig. 3. The position of the prong near the joint of the grip-jaws, but projecting, as it does, away from them, obviates any hinderance of one with the other. The jointed levers, with their laterally-projecting plate grip-jaws, the hook at the extremity of one of the levers, and the curved prong, each constitutes a useful implement, especially useful for lifting any vessel while hot, and being together their convenience and usefulness are enhanced, while the cost of the combined implement is much less than if all were made singly.

This implement may be constructed of various sizes, and made of wrought-iron forged, or preferably of cast-iron malleabled.

Having described my invention, I claim and desire to secure by Letters Patent of the United States—

1. The lifter consisting of two levers, A, jointed together, like a pair of pinchers, having flat-plate jaws c projecting laterally at one side, and a curved prong, g, near the joint, projecting laterally at the other side, as set forth.

2. The lifter consisting of the jointed levers having flat-plate grip-jaws c projecting laterally, a curved prong, g, near the joint, projecting in an opposite direction, and a hook, e, at the extremity of one of the levers, as shown and described.

In testimony whereof I affix my signature in presence of two witnesses.

JAMES B. FITZPATRICK.

Witnesses:
 JOHN P. ST. MYEUS,
 W. C. YEATON, Jr.